Oct. 11, 1932.  J. H. McCARTHY  1,881,819
GEAR SHIFTING MECHANISM
Filed March 13, 1931   3 Sheets-Sheet 1
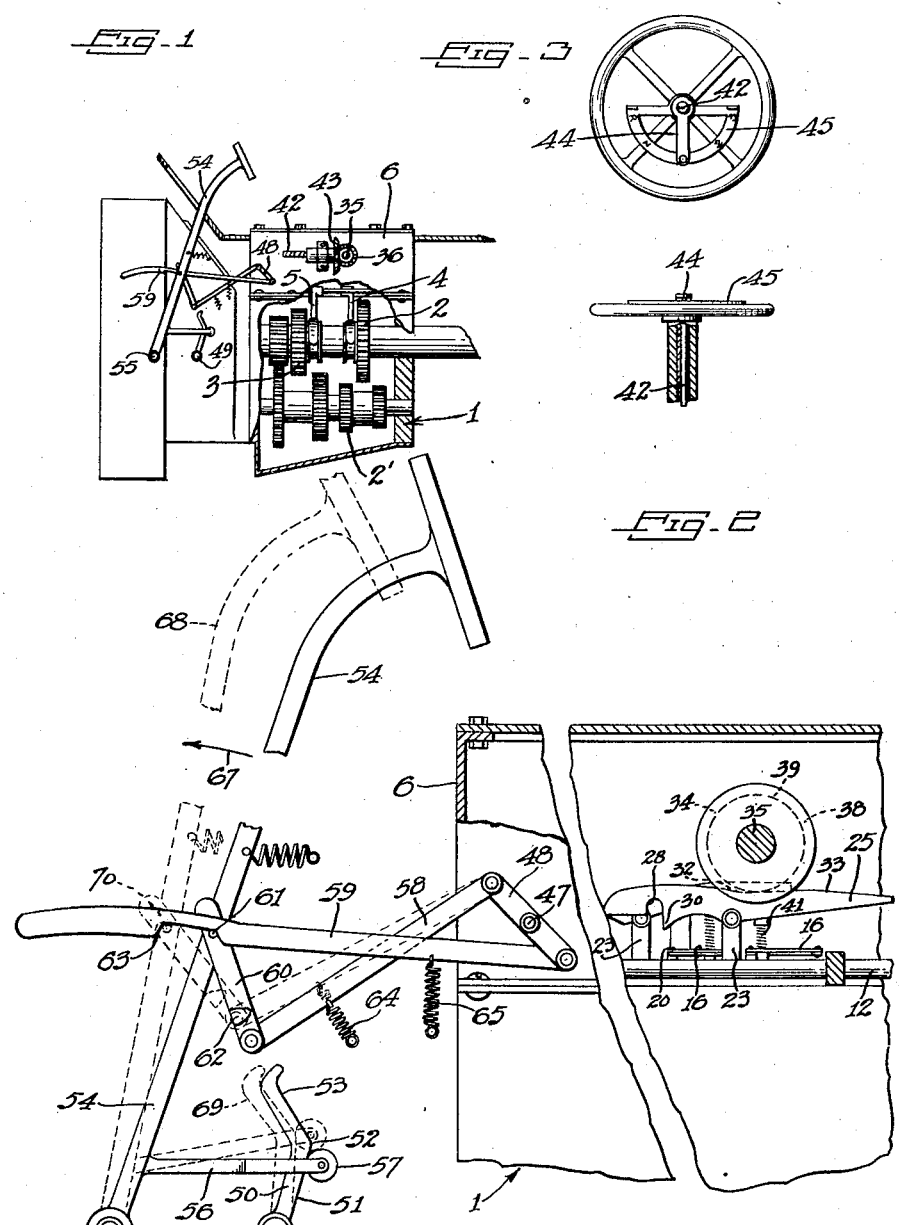
John H. McCarthy
INVENTOR
BY Munn & Co.
ATTORNEYS

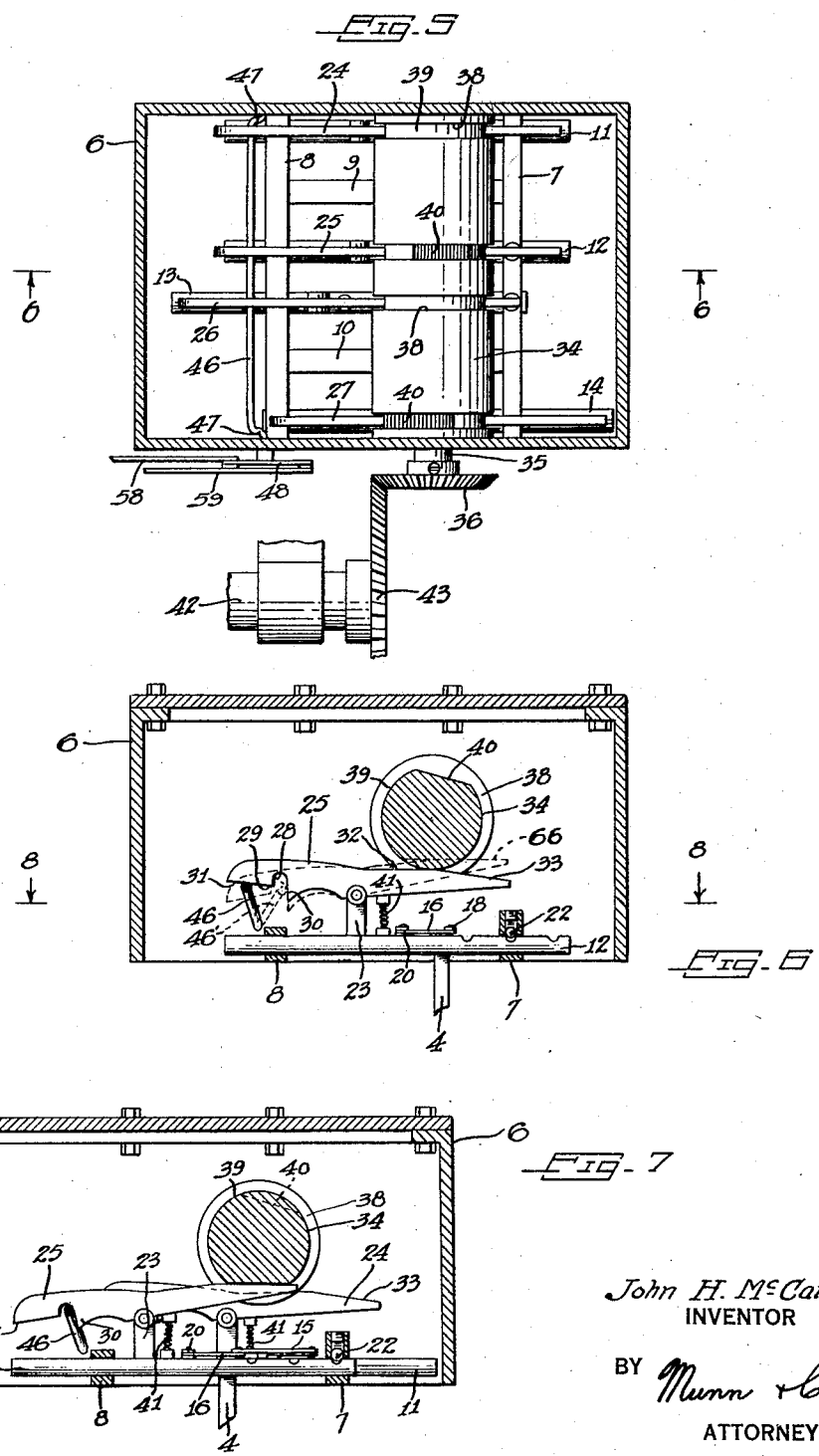

Oct. 11, 1932.   J. H. McCARTHY   1,881,819
GEAR SHIFTING MECHANISM
Filed March 13, 1931   3 Sheets-Sheet 3

John H. McCarthy.
INVENTOR

BY Munn & Co.
ATTORNEYS

Patented Oct. 11, 1932

1,881,819

UNITED STATES PATENT OFFICE

JOHN H. McCARTHY, OF CHICAGO, ILLINOIS

GEAR SHIFTING MECHANISM

Application filed March 13, 1931. Serial No. 522,355.

My invention relates to improvements in gear shifting devices, and it consists in the combinations, constructions, and arrangements herein described and claimed.

An object of my invention is to provide a gear shifting mechanism having novel means for shifting the movable gears in a transmission mechanism.

A further and principal object of my invention is to provide a gear shifting mechanism which is simpler in construction than the gear shifting mechanism set forth in my application for patent Serial No. 424,927, filed January 31, 1930.

Another object is to provide a novel gear shifting mechanism controllable from the steering wheel of a vehicle.

A further object is to provide a novel gear shifting mechanism which is adapted for preselecting the gears to be shifted prior to the actual shifting.

A further object is to provide a novel gear shifting mechanism adapted for use with a standard transmission mechanism.

Other objects and advantages will appear in the following specification, and the novel features of the invention will be particularly pointed out in the appended claims.

Figure 8:
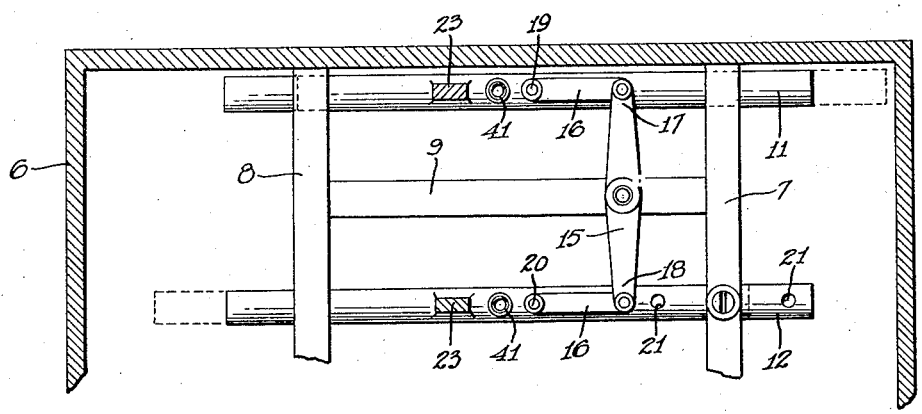
Figure 9:
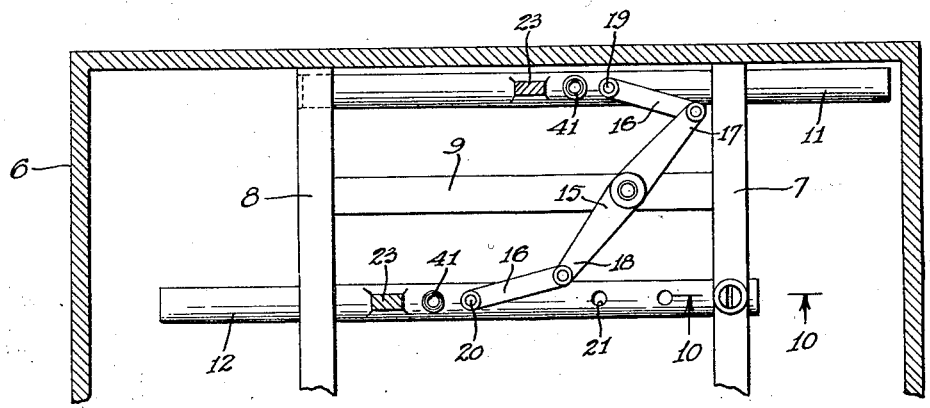
Figures 10, 11:
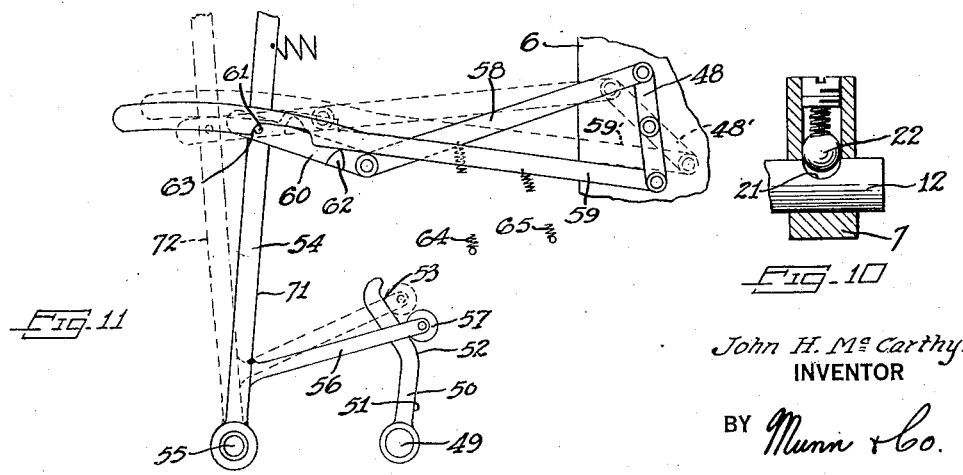

My invention is illustrated in the accompanying drawings, forming part of this application, in which Figure 1 is a side elevation of my invention as used with the transmission mechanism, a portion of the transmission housing being shown in section, Figure 2 is a view of a steering wheel column and steering wheel showing the manner in which the means for selecting the gears to be shifted is associated therewith, Figure 3 is a top plan view of the steering wheel shown in Figure 2 and the means associated therewith whereby the gears to be shifted may be selected, Figure 4 is an enlarged detail elevation of my device with portions thereof being shown in section, Figure 5 is a top plan view of a portion of my gear shifting mechanism, the housing in which the same is disposed being shown in section, Figure 6 is a section taken along the line 6—6 of Figure 5, Figure 7 is a view similar to Figure 6 showing certain elements in their shifted positions, Figure 8 is an enlarged detail plan view of a portion of my device the housing in which it is disposed being shown in section, Figure 9 is a view similar to Figure 8 showing certain elements in their shifted positions, Figure 10 is a section taken along line 10—10 of Figure 9, and Figure 11 is a conventional view showing the movements of a portion of the mechanism shown in Figure 4.

In carrying out my invention I provide a transmission housing 1 in which are disposed shiftable gears 2 and 3. The gears 2 and 3 are provided with actuating arms 4 and 5. A casing 6 is disposed on the housing 1 and is secured thereto by any desirable means. The bottom of casing 6 is provided with a pair of spaced apart and transverse bar portions 7 and 8. Bar portions 9 and 10 are connected with the bar portions 7 and 8.

A pair of members 11 and 12 and a second pair of members 13 and 14 are slidably disposed in the transverse bar portions 7 and 8 and extend therethrough. A lever arm 15 has its central portion pivotally mounted on the bar 9. Link members 16 have an end pivotally connected with the opposite end portions 17 and 18 of the lever arm 15 and their other ends pivotally connected with the slidable members 11 and 12, respectively, as at 19 and 20. In like manner a lever arm is pivotally mounted on the bar portion 10 and is connected by links with the slidable members 13 and 14. The actuating arm 5 is fixedly connected with the slidable member 13 as shown in Figure 1 and the arm 4 is fixedly connected with the slidable member 12 as shown in Figures 6 and 7. Thus it will be seen that when the members 12 and 13 are moved in a given direction the arms 4 and 5, respectively, will be moved thereby for shifting the respective gears 2 and 3 with which they are connected. The members 12 and 13 are provided with spaced-apart recesses 21 for receiving spring pressed ball members 22 whereby the slidable members may be held in their shifted positions. Each of the slidable members 11, 12, 13, and 14 are provided with an upwardly projecting portion 23 on which arms 24, 25, 26, and 27, respectively, are pivotally mounted. Each of the arms 24 to 27, inclusive, is provided with a recess 28, shoulders 29 and 30, and a face 31, the purpose of which will be hereinafter described. Each of the arms 24 to 27, inclusive, are also provided with cam faces 32 and 33. A cam member or cam cylinder 34 is rotatably mounted in the casing 6 and has a portion 35 extending without the casing and provided with a gear 36 fixedly mounted thereon. The cam member or cylinder 34 is provided with circumferential recesses 38 for receiving each of the arms 24 to 27, inclusive. The recesses 38 serve as a guide means for the arms.

The cam member 34 is provided with cam portions 39, each of said portions 39 having a cam face 40. The arms 24 to 27, inclusive, are held in engagement with their respective cam portions by means of expansion springs 41 disposed between said arms and the respective slidable members on which they are mounted. While I have shown the cam member as comprising a cylinder having circumferential recesses for providing the cam portions and cam surfaces it will readily be understood that these recesses might be dispensed with and that a shaft having individual cam members might be substituted for the cylinder. As shown in Figures 1 and 2 a manually actuated cable or shaft 42 has one end provided with a gear 43 in mesh with the gear 36 and the other end positioned adjacent the steering wheel of a vehicle and provided with a manually actuated lever 44. A plate 45 is disposed adjacent the steering wheel and is provided with indicia whereby the lever 44 may be properly positioned for determining the rotative position of the cam member 34 whereby the proper gear in the transmission may be selected for being shifted. A rod member 46 is disposed within the casing 6 and is provided with offset end portions 47 pivotally mounted within the casing, one of said end portions 47 being fixedly connected with an arm 48 disposed on the exterior of said casing as shown in Figure 4.

A clutch actuating shaft 49 is provided with an arm 50 angular in formation and having a face 51, a shoulder 52, and a face 53. A pedal lever 54 is pivotally mounted as at 55 and is provided with a projecting portion 56 having a roller 57 thereon, said roller 57 being normally in engagement with the surface 51 of the arm 50. The arm 48 has one end pivotally connected with the end of an arm 58. The other end of the arm 48 is pivotally connected with the end of an arm 59.

A link member 60 has one end pivotally connected with the pedal lever 54 by means of a pin 61; the other end of said link member being pivotally connected with an end of the arm 58. A link member 60 is provided with a raised lug portion 62 adapted for engaging the arm 59 when moved to a certain position the purpose of which will be hereinafter described. The arm 59 is provided with a cut out portion 63 for receiving the pin 61, the purpose of which will also be hereinafter described. Spring members 64 and 65 have an end connected with the respective arms 58 and 59 and their other ends connected with a fixed member such as the clutch housing.

From the foregoing description of the various parts of the device, the operation thereof may be readily understood. For the purpose of illustration let us first assume that the shifting mechanism is in its neutral position. At this time the actuating lever 44, see Figure 3, is positioned at that portion of the plate 45 indicated by (N). At this time the cam cylinder 34 will be so rotatively positioned that the arms 24, 25, 26 and 27 will be in the position of the arm 25 shown in Figures 4 and 6. At this time also the slidable members 11, 12, 13, and 14 will be in the positions of the members 11 and 12 shown in Figure 8 at which time the axes of the arms 15 will be disposed at right angles to the bars 9 and 10; also the foot pedal 54 is in the position shown in Figures 1 and 2, at which time the rod member 46 is in the position shown in Figure 6. As a matter of fact the foot pedal 54 is always in the position shown in Figures 1 and 4 except when it is actuated by the operator and, when the foot pedal is in this position, the rod member 46 is always in the position shown in Figure 6.

Let us assume that the operator desires to shift the gears into low speed, otherwise known as first position, at which time the gear 2 will be in mesh with the gear 2'. The lever 44 is first moved to the position on the indicating plate marked by the numeral (1) as shown in Figure 3. When the lever 44 is thus moved the shaft 42 will be rotated for rotating the cam cylinder 34 whereby one of the cam faces 40 will be moved into engagement with its respective arm which, in this particular instance, is the arm 25. When the arm 25 is in engagement with its respective cam face 40 it will be in the dotted line position 66 shown in Figure 6. The clutch pedal is then actuated for shifting the gears. The action which takes place is as follows: As the foot pedal 54 moves in the direction of the arrow 67 to its dotted line position 68 as shown in Figure 4, the angular clutch arm 50 will be moved to its dotted line position 69, thereby actuating the clutch mechanism for disassociating the motor with the transmission. At this time the pin 61 will have moved in the slot to its position 70. As the lever 54 continues its movement in the direction of the arrow 67 the pin engages the arm 59 carrying it forwardly causing the rod 46 shown in Figure 6 to move to the dotted line position 46'. As the bar 46 moves from its solid line position shown in Figure 6 to the dotted line position 46', it moves along the surface 31 of the arm 25 thereby lifting said arm until the rod 46 moves into the position 46' at which time the arm 25 will move downwardly so that a portion of the rod 46 will be disposed in the slot 28. At this time the clutch lever 54 shown in Figure 4 will be moved from its position 68 to the position 71 shown in solid line position in Figure 11. It will be seen from Figure 11 that when the clutch actuating lever 54 is in the position 71 the lug 62 will be in engagement with the arm 59, at which time the rod 46 is in the dotted line position 46' shown in Figure 6.

As the clutch lever 54 begins its movement from the position 71 shown in Figure 11 to the dotted line position 72 the lug 62 raises the arm 59 to the dotted line position 59' so that said arm 59 will be out of engagement with the pin 61. As the clutch lever 54 continues its movement to the dotted line position 72, the arms 58 and 60 will move the arm 48 to the dotted line position 48' which is the solid line position shown in Figure 4, at which time the bar 46 will be moved from its dotted line position 46' shown in Figure 6 to the solid line position shown in Figure 7 thereby moving the arm 25, and consequently the slidable member 12, for shifting the gear with which they are associated. It will be seen by referring to Figures 4 and 11 that during all the movements of the clutch lever 54 the angle bar 50 is disposed in the dotted line position shown in Figure 4 which is the solid line position shown in Figure 11 whereby the clutch will be positioned for disconnecting the transmission from the motor. As the clutch pedal 54 returns to its normal position the springs 64 and 65 act on the arms 58, 59, and 60 for returning the arms to their normal positions shown in Figure 4. It will be seen by referring to Figures 4 and 11 that as the clutch lever 54 moves from its dotted line position 72 shown in Figure 11 to its normal position shown in solid in Figure 4 there will be no movement of the bar 46 for shifting the gears and that the clutch will not be actuated for operatively connecting the transmission with the motor until just prior to the clutch lever 54 occupying its normal position. It may be desired that the gear to be shifted be selected prior to the actual shifting thereof.

Let us assume for the purpose of illustration that the operator wishes to select the second speed while running in first speed and does not intend to shift into second speed for some time. The actuating lever 44 shown in Figure 3 is moved until the end of said lever is positioned adjacent the numeral (2) on the indicating plate. The cam cylinder 34 will thus be rotated until the proper cam surface 40 is positioned in engagement with the arm which is operatively associated with the second gear to be shifted. As the cam cylinder 34 is rotated for selecting the second speed gear, the arm 25 associated with the first speed gear will be moved upwardly by reason of its respective cam face being moved out of engagement therewith. At this time the second speed gear will be selected but will not have been shifted until the clutch pedal is actuated. When the clutch pedal is actuated for shifting the gears from the first speed position to the second speed position, the rod 46 will not be disposed in the recess 28 of the arm 25 as shown in Figure 7 but instead will be in engagement with the shoulder 30 so that the arm 25 will be returned to its neutral position when the rod 46 is moved to the position 46' as shown in Figure 6.

I claim:

1. In a transmission mechanism, the combination with a shiftable element, of a pair of reciprocatory members, one of said reciprocatory members being connected with the shiftable element, an actuating element, catch means connected with the reciprocatory members for engaging the actuating element, means for moving the catch means into engagement with the actuating element, means operatively associated with the reciprocatory members for moving the same in opposite directions when the actuating element is moved, an actuating arm fixedly connected with the actuating element, an actuating lever, an auxiliary arm pivotally connected with the actuating arm and operatively connected with the actuating lever for moving the actuating arm in a given direction when the lever is moved a certain distance in one direction, counter arms pivotally connected with the lever and the actuating arms, and means for operatively disconnecting the auxiliary arm from the lever whereby continued movement of the lever in the same direction will cause a counter movement of the actuating arm.

2. In a transmission mechanism, the combination with a power unit and a driving shaft, of shiftable elements, reciprocatory members connected with the shiftable elements, rocker arms movably connected with the reciprocatory members, an actuating element, means for moving the rocker arms into operative engagement with the actuating element whereby the reciprocatory members may be moved, an actuating arm fixedly connected with the actuating element, an actuating lever, means operatively associated with the actuating arm and the lever whereby the arm may be rotated in a given direction when the lever is moved a certain distance in one direction, means for reversing the rotation of the arm as the lever continues its movement in the same direction, and means operatively connecting the actuating lever with a clutch mechanism whereby the driving shaft may be operatively disassociated from the power unit prior to the movement of the reciprocatory members in given directions, and operatively connected with the power unit subsequent to the movements of the reciprocatory members in opposite directions.

3. In a transmission mechanism, the combination with a power unit and a driving shaft, of shiftable elements, reciprocatory members connected with the shiftable elements, rocker arms movably connected with the reciprocatory members, an actuating element, means for moving the rocker arms into operative engagement with the actuating element whereby the reciprocatory members may be moved, an actuating arm fixedly connected with the actuating element, an actuating lever, an auxiliary arm pivotally connected with the actuating arm and operatively connected with the actuating lever for moving the arm in a given direction when the lever is moved a certain distance in one direction, counter arms pivotally connected with the lever and the actuating arms, means for operatively disconnecting the auxiliary arm from the lever whereby continued movement of the lever in the same direction will cause a counter movement of the actuating arm, and means operatively connecting the actuating lever with a clutch mechanism whereby the driving shaft may be operatively disassociated from the power shaft prior to the movement of the reciprocatory members in given directions, and operatively connected with the power unit subsequent to the movements of the reciprocatory members in opposite directions.

JOHN H. McCARTHY.